(12) United States Patent
Choiniere et al.

(10) Patent No.: US 8,342,372 B2
(45) Date of Patent: Jan. 1, 2013

(54) ADHESIVE DISPENSER SYSTEM

(75) Inventors: Stanley W. Choiniere, Southwick, MA (US); Joseph A. DeFilippo, Branford, CT (US); Brett James Zimmerman, Alexandria, MN (US)

(73) Assignee: Handy & Harman, White Plains, NY (US)

( * ) Notice: Subject to any disclaimer, the term of this patent is extended or adjusted under 35 U.S.C. 154(b) by 292 days.

(21) Appl. No.: 12/869,018

(22) Filed: Aug. 26, 2010

(65) Prior Publication Data

US 2011/0031270 A1 Feb. 10, 2011

Related U.S. Application Data

(63) Continuation-in-part of application No. 11/818,451, filed on Jun. 14, 2007, now Pat. No. 8,167,170.

(60) Provisional application No. 60/813,788, filed on Jun. 15, 2006.

(51) Int. Cl.
*B60P 3/22* (2006.01)

(52) U.S. Cl. .................... 222/608; 222/145.5

(58) Field of Classification Search .............. 222/608, 222/618–621, 626, 145.5, 145.6, 182–184, 222/185.1, 181.1–181.3; 239/270–285; 427/286, 427/208.6

See application file for complete search history.

(56) References Cited

U.S. PATENT DOCUMENTS

| | | | |
|---|---|---|---|
| 3,042,271 A | 7/1962 | Winstead | |
| 3,599,840 A | 8/1971 | Speas | |
| 3,940,018 A | 2/1976 | Scholle | |
| 4,174,051 A | 11/1979 | Edwards et al. | |
| 4,252,274 A * | 2/1981 | Kubacak | 239/163 |
| 4,445,551 A | 5/1984 | Bond et al. | |
| 4,564,132 A | 1/1986 | Lloyd-Davies | |
| 4,629,094 A * | 12/1986 | Vogel et al. | 222/82 |
| 4,650,124 A * | 3/1987 | Connaughty et al. | 239/708 |
| 4,789,100 A * | 12/1988 | Senf | 239/61 |
| 4,828,177 A * | 5/1989 | Schuitemaker | 239/165 |
| 4,872,784 A * | 10/1989 | Payne | 405/270 |
| 4,893,751 A * | 1/1990 | Armstrong | 239/150 |
| 5,147,062 A | 9/1992 | Heuberger et al. | |
| 5,255,713 A | 10/1993 | Scholle et al. | |
| 5,284,297 A * | 2/1994 | Kubacak et al. | 239/102.1 |
| 5,477,883 A | 12/1995 | Totten | |
| 5,562,227 A | 10/1996 | Takezawa et al. | |

(Continued)

OTHER PUBLICATIONS

Lauren R. Hartman, Packaging Digest, Nov. 1997, pp. 44, 45 and 52.

(Continued)

*Primary Examiner* — Lien Ngo
(74) *Attorney, Agent, or Firm* — Alix, Yale & Ristas, LLP (57) ABSTRACT

A dispenser system employs a packaging module for use with moisture sensitive materials. The packaging module comprises an outer carton and an inner bladder, which is substantially impermeable to moisture and is filled with one part of an adhesive. The carton is loaded on a mobile cart and the one part adhesive is supplied to a pump/mixer without exposure to moisture in the atmosphere. The packaging and dispensing system can be used in conjunction with mechanized adhesive application equipment for the construction trades. A cart which employs multiple transversely spaced mixing nozzles is employed to produce transversely spaced beads of adhesive as the cart is pushed along a surface. Part 1 adhesive component and part 2 adhesive component are independently pumped to mixing nozzles which dispense the adhesive in beads.

16 Claims, 13 Drawing Sheets

U.S. PATENT DOCUMENTS

| | | | |
|---|---|---|---|
| 5,566,851 A | 10/1996 | Sasaki et al. | |
| 5,868,319 A * | 2/1999 | Gilmore | 239/290 |
| 5,878,915 A | 3/1999 | Gordon et al. | |
| 5,911,403 A | 6/1999 | deCler et al. | |
| 6,149,341 A * | 11/2000 | Nculing | 404/75 |
| 6,220,526 B1 * | 4/2001 | Johnson | 239/323 |
| 6,260,743 B1 * | 7/2001 | Mazzenga | 222/611.2 |
| 6,294,761 B1 | 9/2001 | Diederich et al. | |
| 6,502,697 B1 | 1/2003 | Crampton et al. | |
| 6,547,158 B1 * | 4/2003 | Smith | 239/150 |
| D501,855 S | 2/2005 | Burns | |
| 6,848,599 B2 | 2/2005 | Hammarth et al. | |
| 6,942,735 B2 * | 9/2005 | Rich | 118/313 |
| 7,056,556 B2 * | 6/2006 | Burns | 427/286 |
| 7,344,052 B2 | 3/2008 | Light | |
| 2003/0196703 A1 | 10/2003 | deCler et al. | |
| 2006/0278656 A1 | 12/2006 | Ross | |
| 2008/0000928 A1 | 1/2008 | Choiniere et al. | |

OTHER PUBLICATIONS

Low Rise Foam Adhesives Handout: 55$^{th}$ MRCA Convention (www.ersystems.com/pdf/RCI-MRCALowriseadhesive 10-04.pdf).

\* cited by examiner

ADHESIVE DISPENSER SYSTEM

CROSS-REFERENCE TO RELATED APPLICATION

This application is a continuation-in-part of U.S. patent application Ser. No. 11/818,451 filed on Jun. 14, 2007 now U.S. Pat. No. 8,167,170, which claims priority of U.S. Provisional Application No. 60/813,788 filed on Jun. 15, 2006.

FIELD OF THE TECHNOLOGY

This application is directed to a packaging system for moisture-sensitive materials, and more particularly, to a dispensing system for moisture-sensitive adhesive materials used in the construction industry.

BACKGROUND OF THE INVENTION

In the construction industry, most moisture-sensitive materials, such as adhesive components, are packaged in a variety of sealable containers to prevent the contents from absorbing water from the atmosphere or moisture that collects on the surfaces of dispensing systems. Moisture commonly migrates into the fittings, nozzles and conduits of such dispensing systems. The dispensing system becomes clogged and the dispensing qualities are degraded to the extent that the system must be disassembled and cleaned. Significant costs and inefficiencies result from having to remove moisture which collects in the components of the dispensing system.

If the moisture-sensitive material is to remain viable over time, the user has to make sure that the packaging is tightly closed during periods of non-use. However, moisture-sensitive materials are inherently difficult to store after opening the original packaging, so in many cases, the unused portion is discarded after a construction job is completed. If moisture-sensitive materials are not discarded after opening the primary container, the material begins to chemically degrade, which can negatively affect the performance and physical properties of the remaining material. Additionally, the necessity of routinely discarding the unused portions of moisture-sensitive materials is costly, inconvenient, and environmentally unsound.

For some applications, such as securing membranes in roofing systems, two-part adhesives are used. The membranes are typically in the form of 10 feet by 100 feet rolls. Typically, the membrane is rolled out and positioned on the roof. The membrane is folded-over and adhesive is applied in long multiple beads to the now upper underside surface of the folded-over material which is approximately a 5 feet by 100 feet strip. Depending on the building codes and the requirements for the materials, multiple beads of adhesive are typically required. The adhesive is applied and the material is then pressed onto the roofing substructure. The other underside of the membrane is then folded over and the adhesive again applied in multiple beads to the surface. The membrane is then unfolded and pressed against the roofing substructure. Rollers or other structures are used to downwardly press the membrane.

SUMMARY

An adhesive dispenser system for moisture-sensitive materials, such as construction adhesives, is provided. The adhesive dispenser system employs a packaging module which protects the contents therein from moisture in the atmosphere during use as well as during pre- and post-use storage and shipping. In one preferred embodiment, a packaging module comprises an outer container body or carton and an inner bag or bladder made of a water-impermeable flexible sheet material. The bladder has a truncated spout closed by a cap which is preferably valved. The bladder is filled with one part of an adhesive. The outer container body is preferably equipped with a handle, an opening to provide access to the spout and a window to allow inspection of the contents remaining in the bladder. The packaging module is adapted for efficient use with mechanical or motorized applicator systems.

The inner bladder receives and contains the moisture-sensitive material during shipping, use, and storage. It is also preferred that the spout has sidewalls extending upwardly to form a ridged neck portion and that the cap be threaded to the spout. Preferably, the spout and cap are manufactured from a durable plastic material. The spout can be closed or sealed either by use of a valved cap or similar sealing means. The spout via the cap is re-sealable after a first use such that the material therein remains in substantially the same condition as it was upon the first opening or first use of the material.

Briefly stated, one embodiment of a dispensing apparatus for a two-part adhesive comprises a cart having a tray. The carts mount a pump assembly which has a pair of inlets and a pair of outlets which communicate with a mixer/applicator gun. A first package encloses a bladder with an opening and which contains a first adhesive component. A second package encloses a bladder with a second opening and which contains a second adhesive component. The packages are each received on the tray. A conduit communicates via a first valve connector assembly between the opening of the package assembly and an inlet to the pump. A second conduit communicates via a second valve connector assembly between an opening of the second package and a second inlet to the pump. The first and second adhesive components are pumped by the pump assembly to a mixer/gun assembly and dispensed therefrom.

At least one package has a corrugated configuration. The package has a general rectangular shape with a handle mounted at one side. The package also has a window to permit inspection of the adhesive component contained in the corresponding bladder. The tray has a retention flange which surrounds the packages with the first and second packages being generally aligned in adjacent side disposition on the tray. At least one of the connector assemblies upon connection to the conduit does not permit exposure of the component in the bladder to the atmosphere. The connector assembly comprises a poppet valve and a snap-fit type connection. The snap-fit type engagement closes off the corresponding opening upon disconnecting the associated conduit from the opening. A hose connects the outlet to a mixer. The cart may further have a pair of wheels and handlebars for facilitating movement across a surface.

A method of dispensing a moisture sensitive adhesive with a mobile applicator system comprises providing a package having an outer container and an inner flexible enclosure that is substantially impermeable to moisture. The enclosure has an opening and is closed by a cap. The enclosure contains one part of an adhesive. The package is inverted. The package is then loaded onto a tray of the mobile applicator system. A conduit is connected for communication through the opening without exposing the one part to the atmosphere. The one part is mixed with the second part to form an adhesive and the adhesive is dispensed under pressure for application.

The conduit connecting step may employ lifting a valve to permit communication of one part into the conduit and implementing a snap fit connection between fittings of the cap and the conduit. The conduit may be disconnected from communication with the opening without exposing the one part in the inner enclosure to the atmosphere.

A packaging module comprises a carton having a box-like shape with one side having an opening. A water impermeable enclosure is disposed in the carton and has a spout alignable with or disposed in the opening and enclosed by a cap with a valve. A moisture sensitive part of the adhesive is disposed in the enclosure. A second side of the carton has a cutout portion defining a window. A handle extends from the first side. The carton preferably has a corrugated construction.

One cart embodiment is adapted for dispensing beads of adhesive. A frame assembly has a pair of frontal wheels and a wheel at a lower rear portion with a pair of upper transversely spaced handle bars. A tray is mounted to the frame assembly and has a pair of openings. A carton containing one adhesive part and a carton containing a second adhesive part are received on the tray. A dual pump assembly is mounted to the frame assembly and has two independent inlets and two independent outlets. First and second conduits connect the dual pump unit at the inlets. First and second outlet manifolds respectively communicate with the outlets. Each manifold has a plurality of connectors.

A mounting bar at a lower frontal portion of the frame assembly mounts a plurality of transversely spaced nozzles. Pairs of conduits connect a connector of each of the two manifolds and a nozzle. When a part 1 component carton and a part 2 component carton is received on the tray and connected to the first and second conduits and the pump is activated, part 1 component and part 2 components are pumped to the nozzles, mixed and expelled as an adhesive through the nozzles.

The nozzle mounting bar is pivotally adjustable about a transverse axis. The mounting bar has transversely extending slots. Nozzles are secured to the bar along the slots and are selectively variably positionable along the mounting bar. A pair of wing extensions is mounted at opposite ends of the mounting bar. The extensions are adapted for selective pivotable positioning relative to the mounting bar. Each extension includes a slot and preferably a nozzle mounted along the slot. The extensions are positionable in a co-linear relationship to the mounting bar so that nozzles mounted to the extensions align with the nozzles mounted to the mounting bar in general parallel spaced relationships.

One conduit of the conduit pairs includes a distinctive marking. The conduit pairs and nozzles are removably dismountable for discarding. The tray is preferably disposed at a slight forwardly downward orientation. The dual pump assembly is preferably powered by a gasoline engine which is controlled by a throttle lever. A clutch is interposed between the engine and the dual pump assembly. As the cart is moved along a surface transversely spaced beads of adhesive are applied to the surface.

A method for applying adhesive to a roofing membrane comprises loading part 1 adhesive and part 2 adhesive to a mobile cart having a plurality of transversely spaced mixing nozzles. Part 1 adhesive is pumped to each mixing nozzle. Part 2 adhesive is also pumped to each mixing nozzle. The part 1 and part 2 adhesive is mixed in the nozzle and dispensed as adhesive from each said nozzle. The cart is pushed or pulled over the membrane or the substrate to produce transversely spaced beads of adhesive.

The pumping is automatically terminated in the event of a clogged condition. The spacing between the nozzles may be selectively adjusted for a given application. In addition, a selected number of nozzles may be employed for a given dispensing application. The angle of nozzle dispensing is also adjustable.

A better understanding will be obtained from the following detailed description of the presently preferred, albeit illustrative, embodiments of the adhesive dispenser system.

DETAILED DESCRIPTION OF THE PREFERRED EMBODIMENTS

An adhesive dispenser system is adapted for use with moisture sensitive materials, such as two-part polyurethane adhesives used in the construction trades. For example, one commonly used chemical component for adhesive for which the system has particular applicability is methylene diphenyl diisocyanate (MDI)-which is moisture sensitive. The adhesive dispenser system, designated generally as 10, employs at least one packaging module 11 which protects the pre-mixed components from moisture in the atmosphere, prevents the escape of volatile materials and ultimately substantially prevents, if not eliminates, crystallization in the pump, mixing components, conduits, delivery hoses and fixtures. The adhesive dispenser system 10 is used to facilitate the mixing and dispensing of moisture sensitive materials, as well as to ensure material integrity during shipping, pre-use storage and post-use storage.

Figure 6:
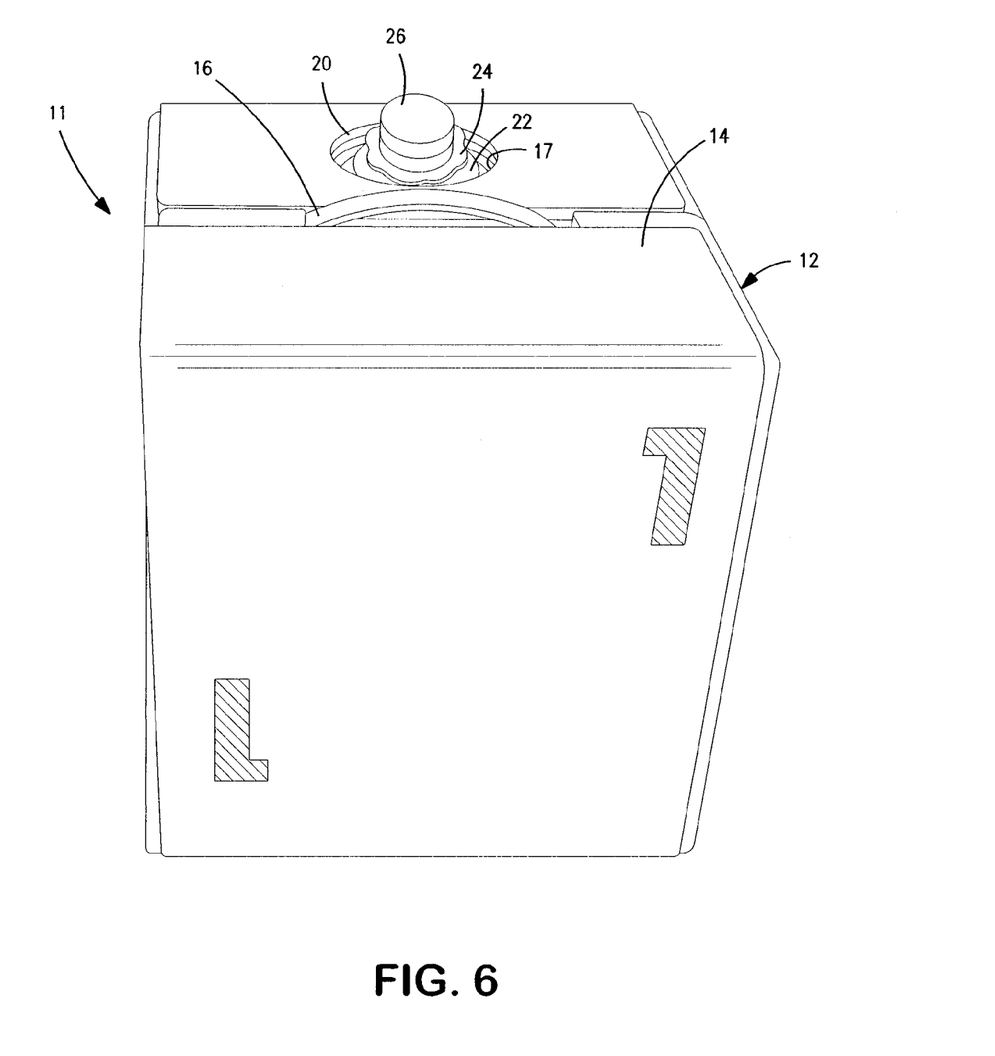
FIG. 6 is a frontal perspective view of a packaging module which may be employed in the adhesive dispenser.
Figure 7:
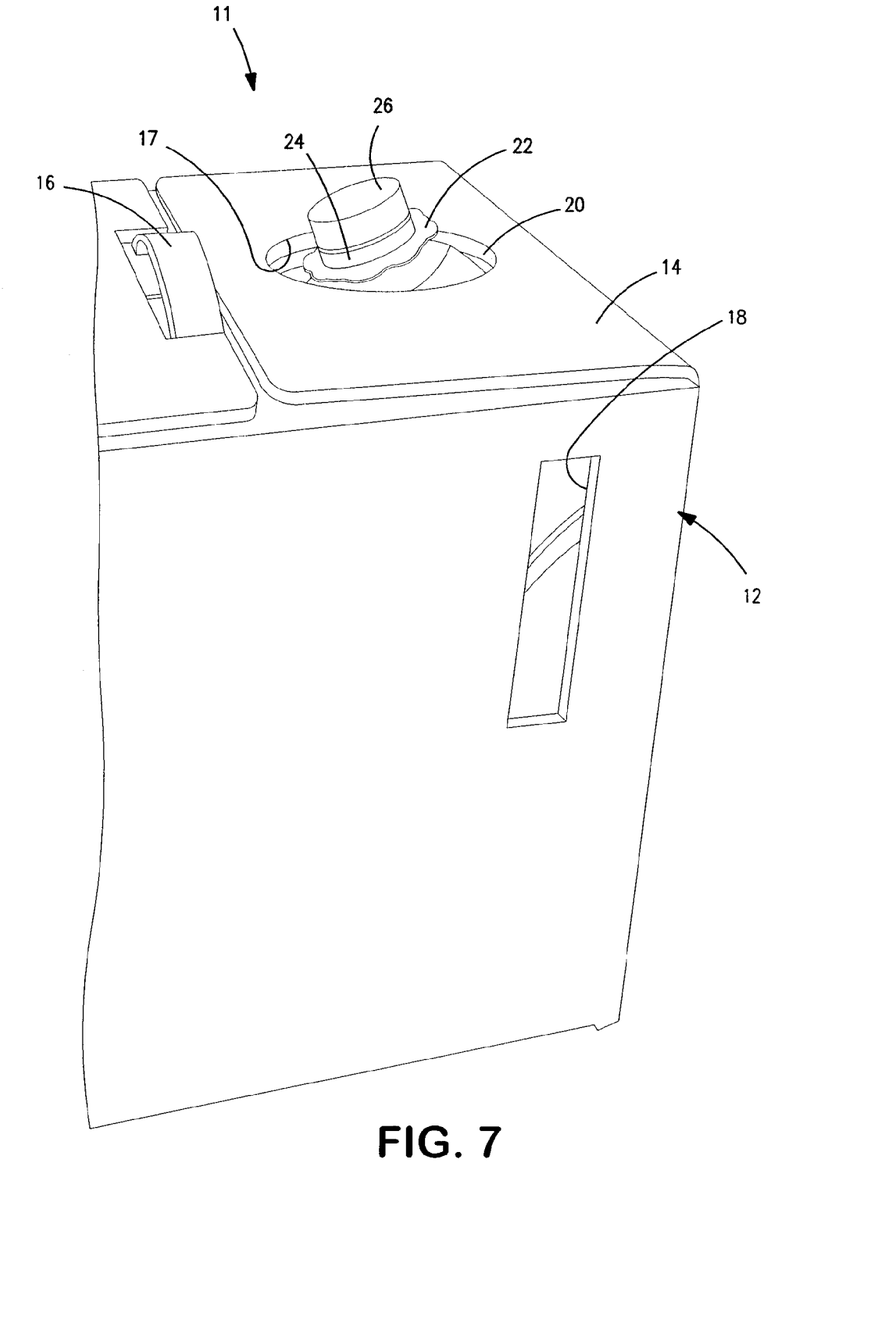
FIG. 7 is a fragmentary perspective view of the packaging module of FIG. 6 from a second side thereof.
Figure 8:
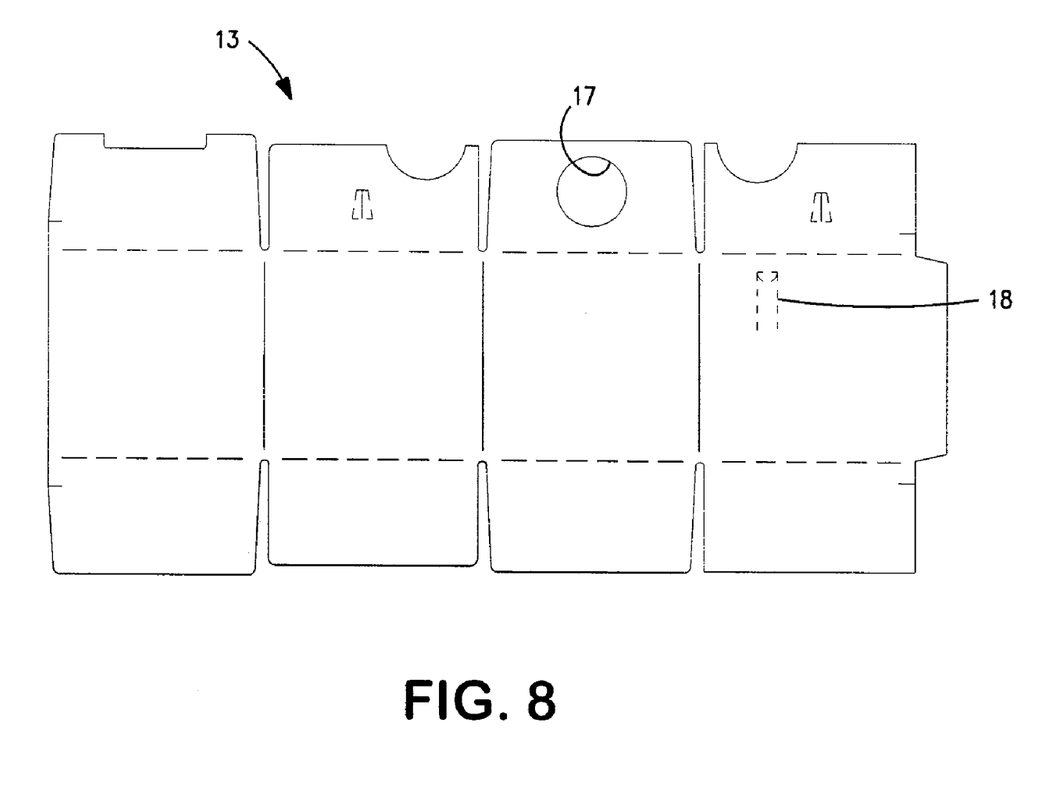
FIG. 8 is a plan view of a pre-assembled form for an outer portion of the packaging module of FIG. 6.

With reference to FIGS. 6-8, in one preferred embodiment, a packaging module unit 11 comprises an outer container body or carton 12 and an inner bag member or bladder 20 (only partially illustrated). The inner bladder 20 is made of a water-impermeable flexible sheet material and has a spout 22 which is closed by a threaded cap 24. As described below, the cap 24 is valved and adapted for efficient connection with a conduit. The spout 20 may be truncated and have a reinforced ridged neck portion. The bladder is filled with one part of the adhesive (not illustrated) and, upon filling, substantially occupies the interior volume of the carton 12 and preferably closely conforms to the interior sides of the carton. The carton 12 is preferably a corrugated rigid or semi-rigid, box-like structure manufactured from a die cut panel 13 such as illustrated in FIG. 8. The carton supports and protects the bladder 20 and its contents and also facilitates transportation and handling.

For storage and transportation purposes, the carton 12 includes a top side 14 to which a handle 16 is affixed. The carton also has an opening 16 in side 14 to provide access to the spout 22 and cap 24 of the bladder. Another side of the carton includes an elongated window 18 which extends to a short distance from the top surface to allow inspection of the contents of the bladder and, in particular, the amount of remaining material.

The inner bladder 20 receives and contains the moisture-sensitive material during shipping, use and pre- and post-use storage. Preferably, the inner bladder 20 is manufactured from a durable plastic material which is translucent or transparent to allow the contents to be viewed. It is preferred that the inner bladder 20 has a raised reinforced spout 22 equipped for threading with interior threads of the cap 24. The spout 22 has sidewalls extending upwardly to form a ridged structure to an opening for the bladder. The cap 24 is pre-installed shortly after the adhesive components are placed in the bladder 20.

In another preferred embodiment, the spout 22 is self-sealing either by use of a twist-cap, valve, or similar closing or sealing means. According to this embodiment, the spout 22 is repeatedly sealable so that the material therein remains in substantially the same condition as it was upon the first opening or first use of the material inside the bladder 20.

In another embodiment, the carton 12 has an inside surface (not illustrated) that is covered or coated with a substantially water impermeable membrane so that the inside surface forms a substantially continuous liner member. According to this embodiment, the spout is sealed with the liner member so that any material contained within is substantially protected from moisture. Alternatively, the spout and the membrane defining the liner are manufactured as a one-piece unit.

Figure 1:
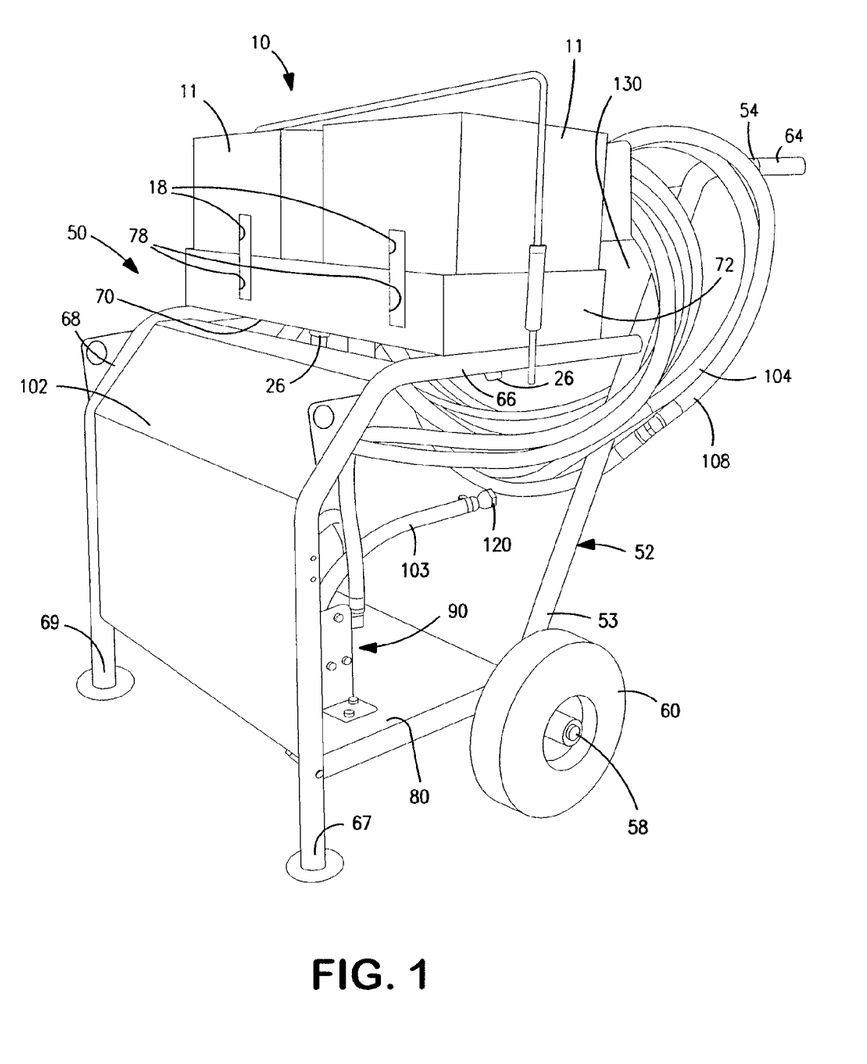
FIG. 1 is a perspective view of an adhesive dispenser system with portions of the system being removed.
Figure 2:
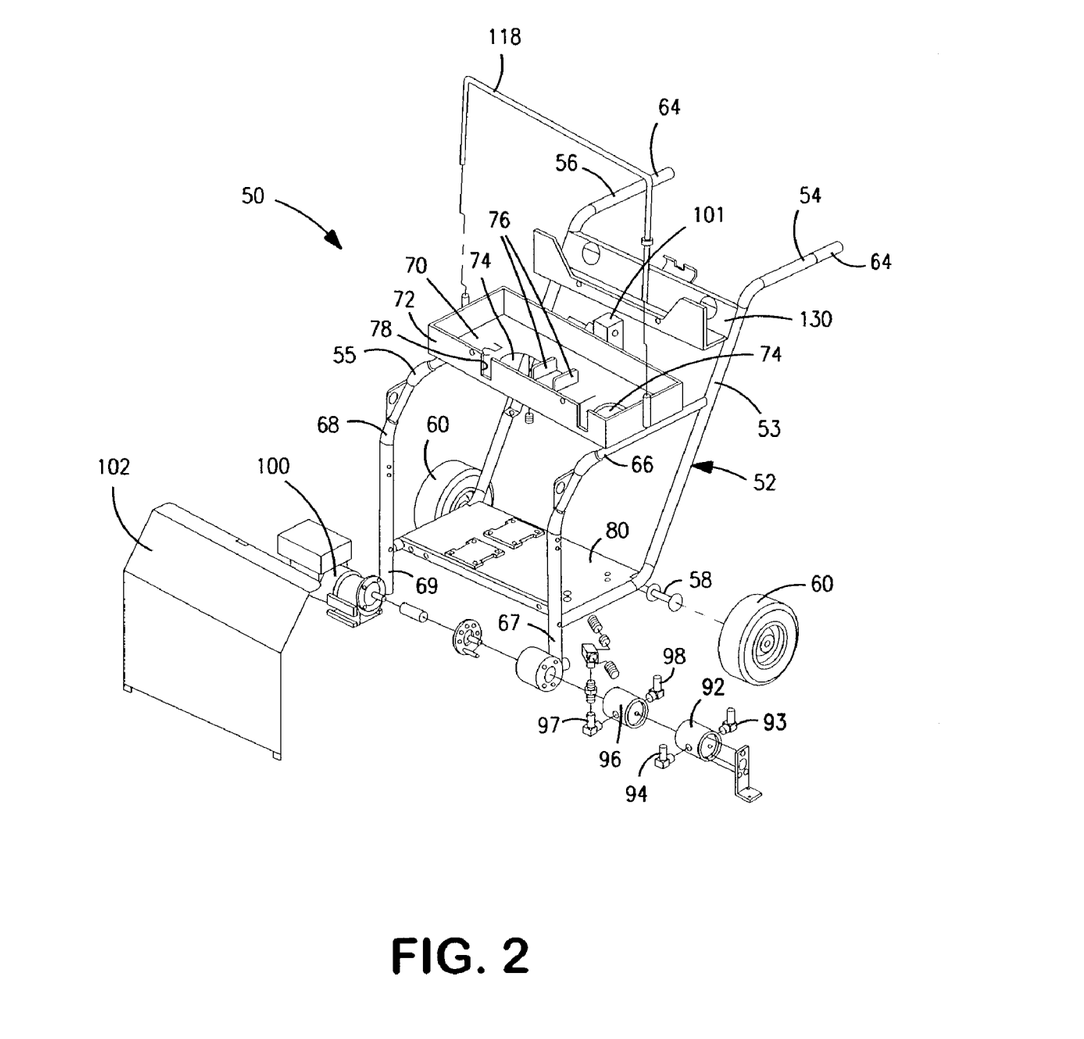
FIG. 2 is an exploded view of a portion of the adhesive dispenser system of FIG. 1.

With reference to FIGS. 1 and 2, the packaging module 11 is especially adapted for incorporation and use in conjunction with a mobile dispenser cart 50. The cart 50 includes a tubular support frame 52 which mounts the various dispenser components and component materials and provides mobility and efficient organization for the dispenser system. The frame 52 includes a pair of laterally spaced, angled tubular supports 53 and 55 which upwardly terminate in handlebars 54 and 56 and, at a lower rear location, receive an axle 58 for a pair of wheels 60. The handlebars angle rearwardly at an upper rear location and include a pair of grips 64 to facilitate manual movement of the cart. A pair of laterally spaced angled tubular supports 66 and 68 extends forwardly from a medial location of the handlebars and extends downwardly to terminate at a pair of support legs 67 and 69. The legs provide a stable support for the cart and allow the cart to be pivotally tilted for movement of the cart in hand-truck fashion whereby the wheels 60 support the cart and facilitate rolling movement.

A lateral, generally horizontal tray 70 is mounted to the support arms. The tray has a circumferential upstanding retaining flange 72. The tray has openings 74 (FIG. 2) as well as a pair of spaced centrally located upright position guides 76. A pair of forward laterally spaced slots 78 is also formed in the retention flange 72.

Figure 3:
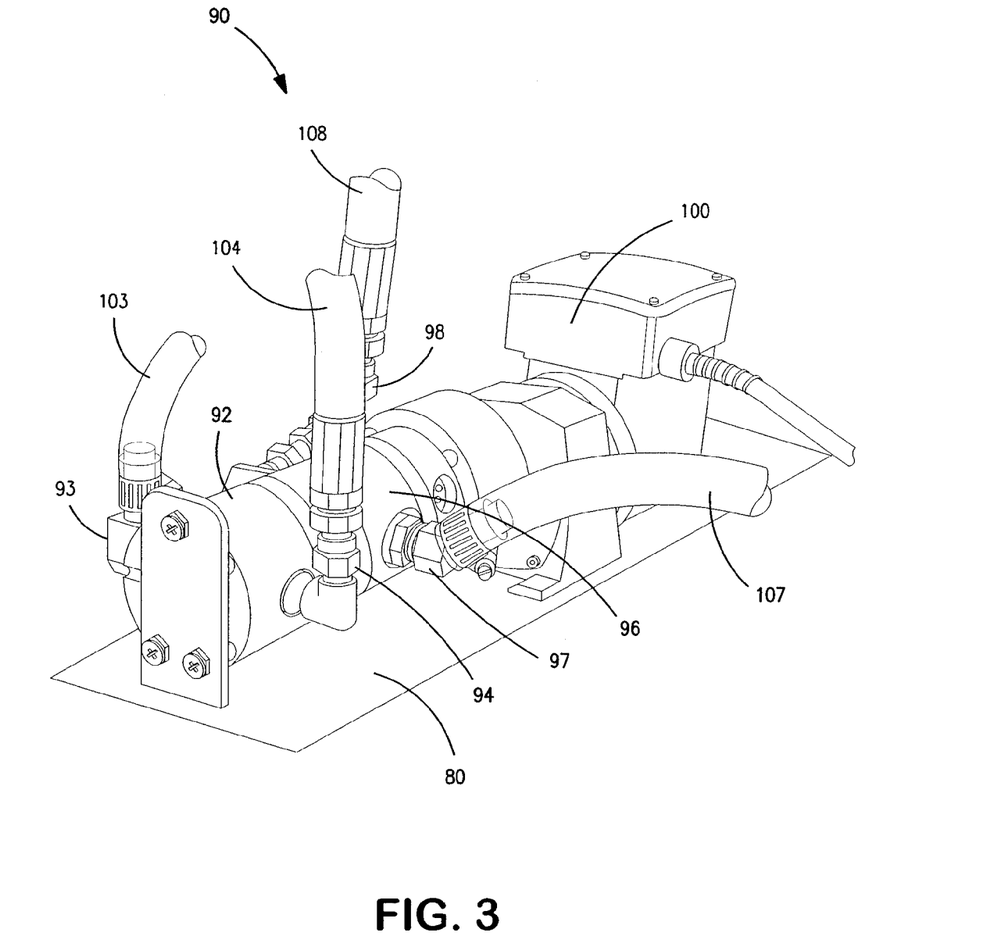
FIG. 3 is an enlarged fragmentary perspective view of a portion of the adhesive dispenser system of FIG. 1, viewed generally from the rear.

With additional reference to FIG. 3, a shelf 80 extends between the supports 53 and 55 at a lower forward position adjacent the joining with supports 66 and 68 to form a generally horizontally disposed support platform. A dual inline geroter pump assembly 90 is mounted to the lower support platform. A pump unit 92 has an inlet 93 and an outlet 94. Pump unit 96 (mounted in reverse relationship to pump unit 92) has an inlet 97 and an outlet 98. Inlets 93 and 97 communicate and connect via connectors with respective transparent conduits 103 and 107 which communicate with the packaging units 11 so that each part of the adhesive is generally supplied under gravity to the respective pump unit. Outlet fittings 94 and 98 connect with the dispensing/delivery hoses 104 and 108. The pump units are driven by an electric motor 100 which is controlled by a control module 101 mounted to the rear of the tray. A skirt 102 may be mounted to the front of supports 66 and 68 to generally enclose and protect the various conduits and the pump assembly 90.

Figure 4:
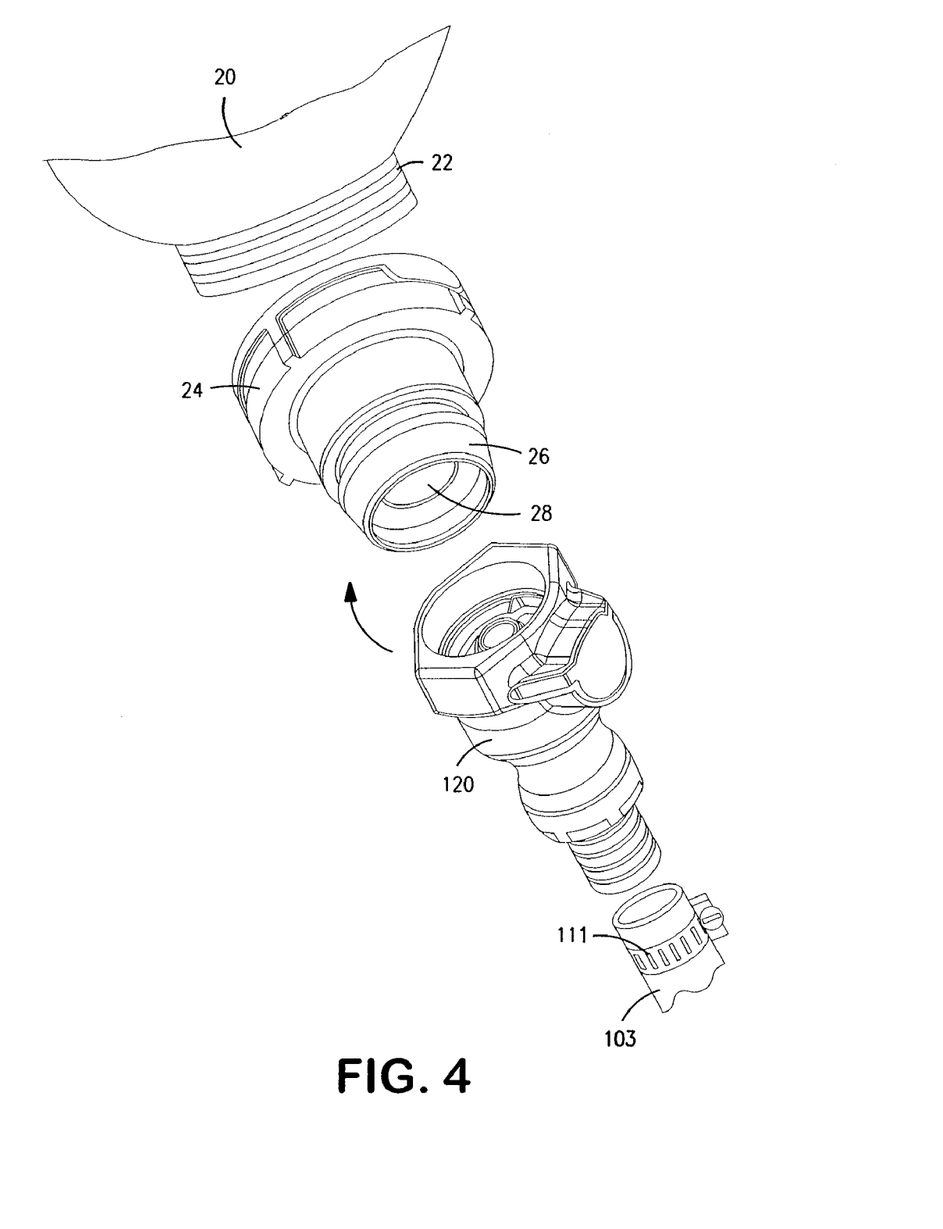
FIG. 4 is an enlarged fragmentary perspective view, partly exploded and partly in schematic, illustrating a portion of the adhesive dispenser system of FIG. 1.
Figure 5:
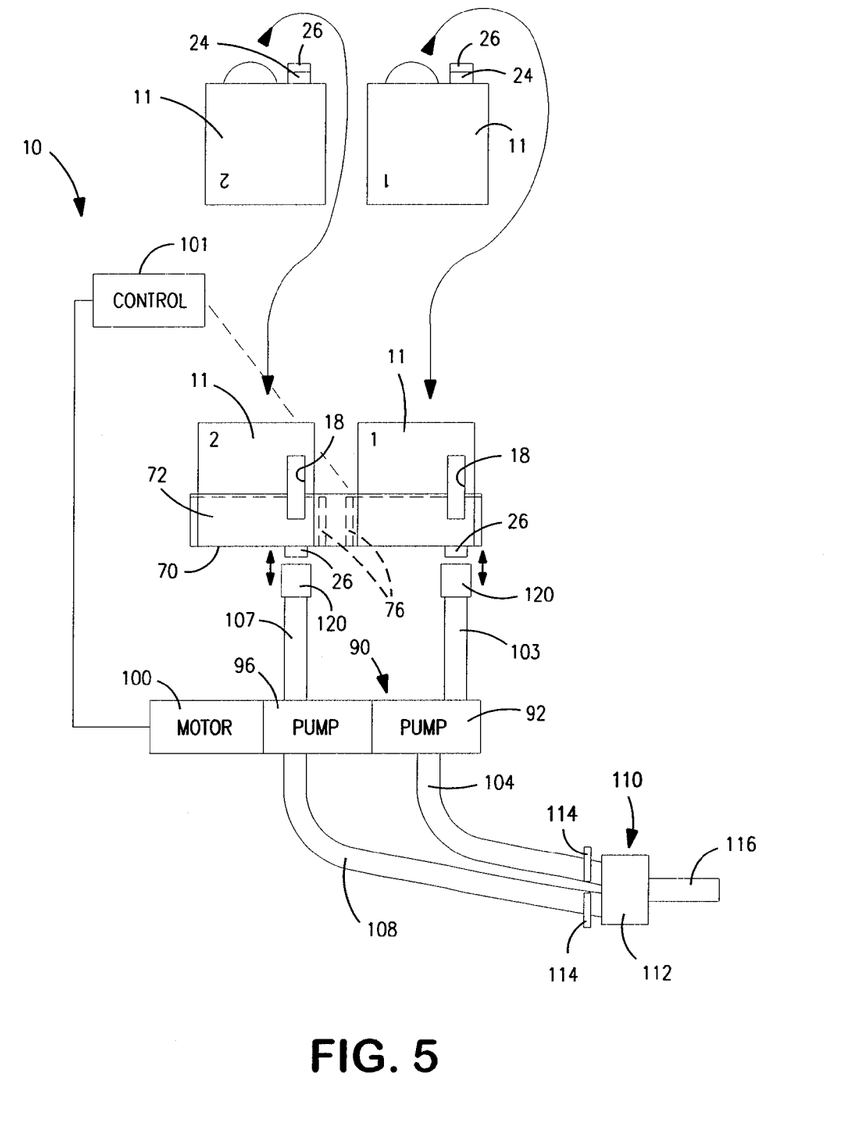
FIG. 5 is a schematic view illustrating the operation of an adhesive delivery system.

With additional reference to FIG. 5, the tray 70 is dimensioned and configured for receiving respective cartons 11 for the first and second parts of the adhesive. With additional reference to FIG. 4, the cartons are configured for usage and connection by the cap 24 which has a projecting male fitting 26 and an intermediate poppet valve 28. The carton is then inverted so that the top side 14 rests on the tray. The carton is positioned so that the projecting male fitting 26 is received in the tray opening 74 or alignable therewith. The window 18 of the carton preferably essentially aligns with a slot 78 of the tray. An upstanding guide 76 engages one side of the carton to facilitate proper positioning. The same process is repeated for the carton 11 of the other part (for a two part adhesive).

An inverted U-shaped retention bar 118 is then mounted over the top of the tray and each module 11 to secure them in position. For applications where only one part is moisture sensitive, only one packaging module 11 may be employed.

Conduits 103 and 107 respectively extend from each inlet 93 and 97 and at an opposite end mount via a hose clamp 111 a female fitting 120. Fitting 120 couples with the cap fitting 26 to provide an efficient snap fit connection and open the poppet valve 28 for providing a flow connection from the container bladder to the conduit without exposure to the atmosphere. The fittings which provide for the connection may be similar to that disclosed in U.S. Pat. No. 5,911,403, the disclosure which is incorporated herein by reference.

Hoses 104 and 108 connect with a mixing nozzle 110. In one embodiment the hoses 104 and 108 are each approximately 30 feet in length. Each of the cartons may thus be connected to the pump assembly and ultimately the dispensing hoses 104 and 108 and the mixing gun assembly 110 without exposure to the atmosphere (and disconnected from the packaging module contents). The dispensing hoses 104 and 108 extend from the pump outlets 94 and 98 to provide a delivery conduit for delivery of the adhesive parts to the mixer 112. The hoses each preferably have lever operated valve 114 at the input openings to the mixer 112. Upon mixture of the constituent two parts, the adhesive is forced under pressure through a dispensing fixture or nozzle, such as representative wand 116 which includes a helical output path.

A bracket 130 may traverse at an upper location between the supports 53 and 55 to provide a retaining support for coiling the hoses 104 and 108 and/or power cords. The control module 101 including a switch is mounted at the rear of the tray to provide an accessible control unit for operating the pump assembly 90.

It should be appreciated that in the event it is necessary to replace one of the components for the adhesive, replacement is relatively efficiently accomplished by disengaging the snap fit connectors 26, 120 which, due to the poppet valve nature, does not expose the adhesive components to the atmosphere, and replacing the carton 11 with another suitable carton 11 as previously described.

With reference to FIGS. 9-14, a mobile dispenser cart which is adaptable for applying multiple spaced beads of a two-part adhesive is generally designated by the numeral 150. The cart employs part 1 and part 2 adhesive components packaged in cartons 11, as previously described. The cart has equipment adapted to mix the parts and apply multiple beads of adhesive to long panels of membrane in an efficient and automated process. The cart 150 is also designed to prevent or alleviate clogging conditions and facilitate cleanup and maintenance.

Figure 9:
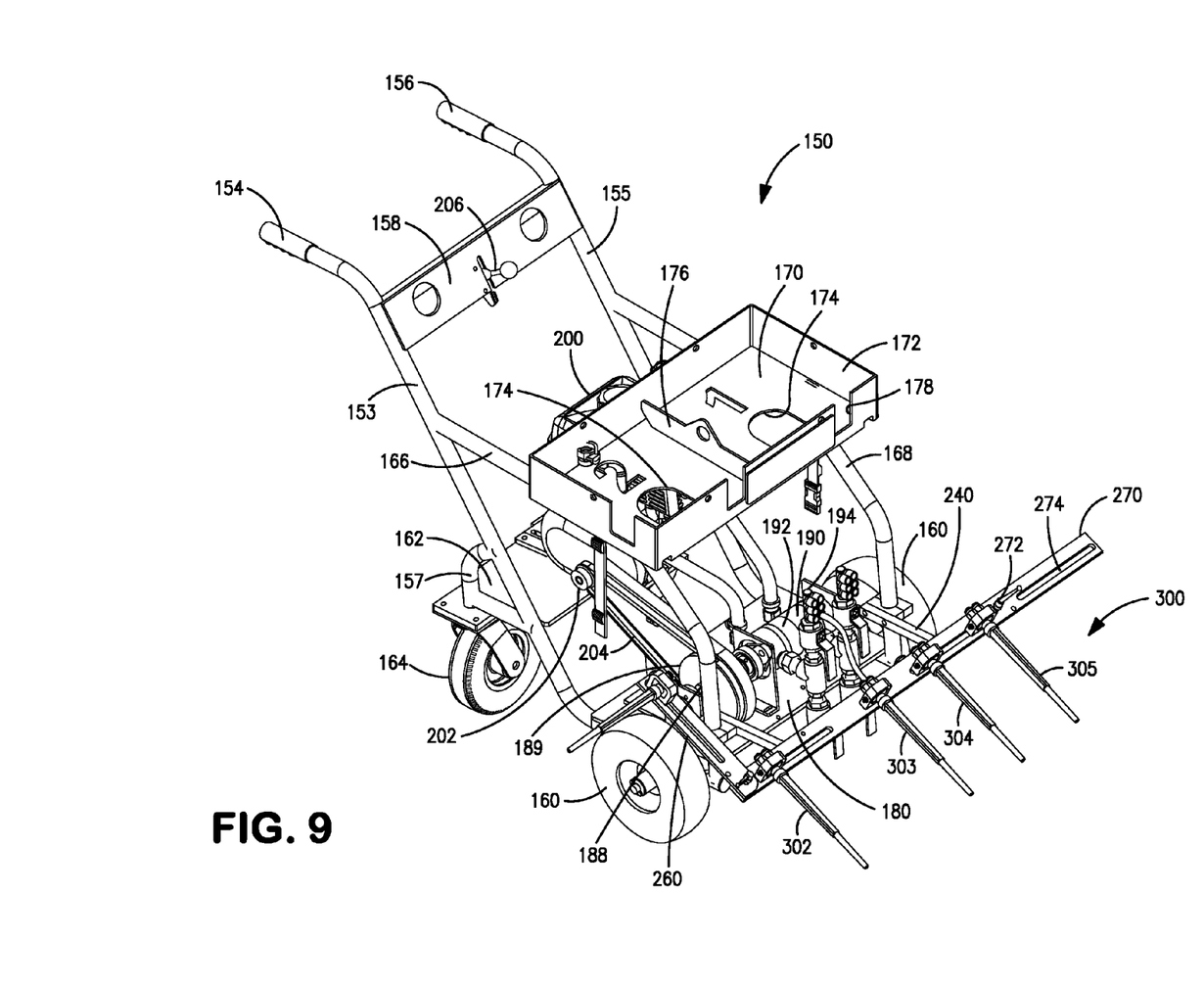
FIG. 9 is a perspective view, portions removed, of a dispensing cart adapted for multi-bead applications of two-part adhesive.
Figure 10:
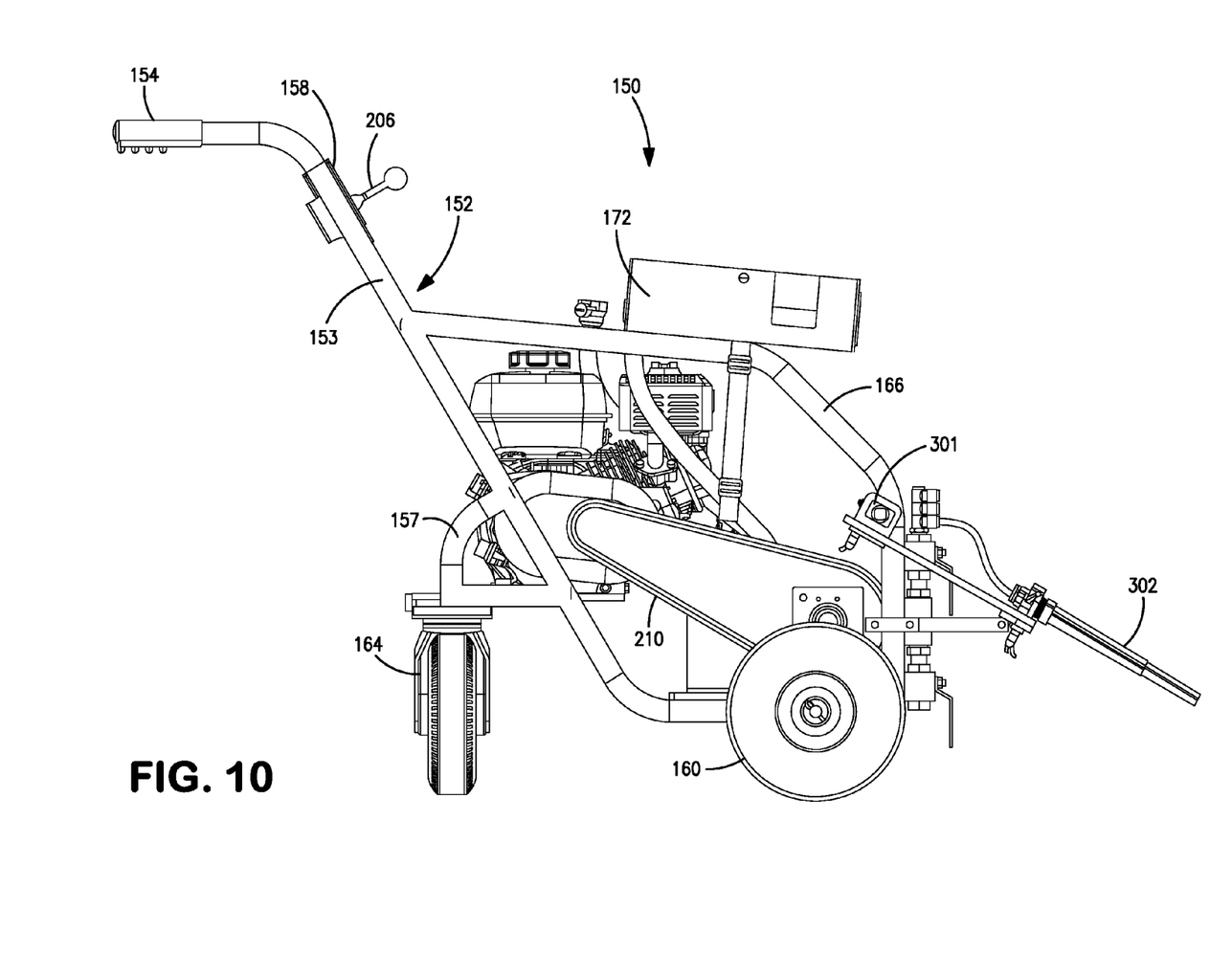
FIG. 10 is a side elevational view of the dispensing cart of FIG. 9.
Figure 11:
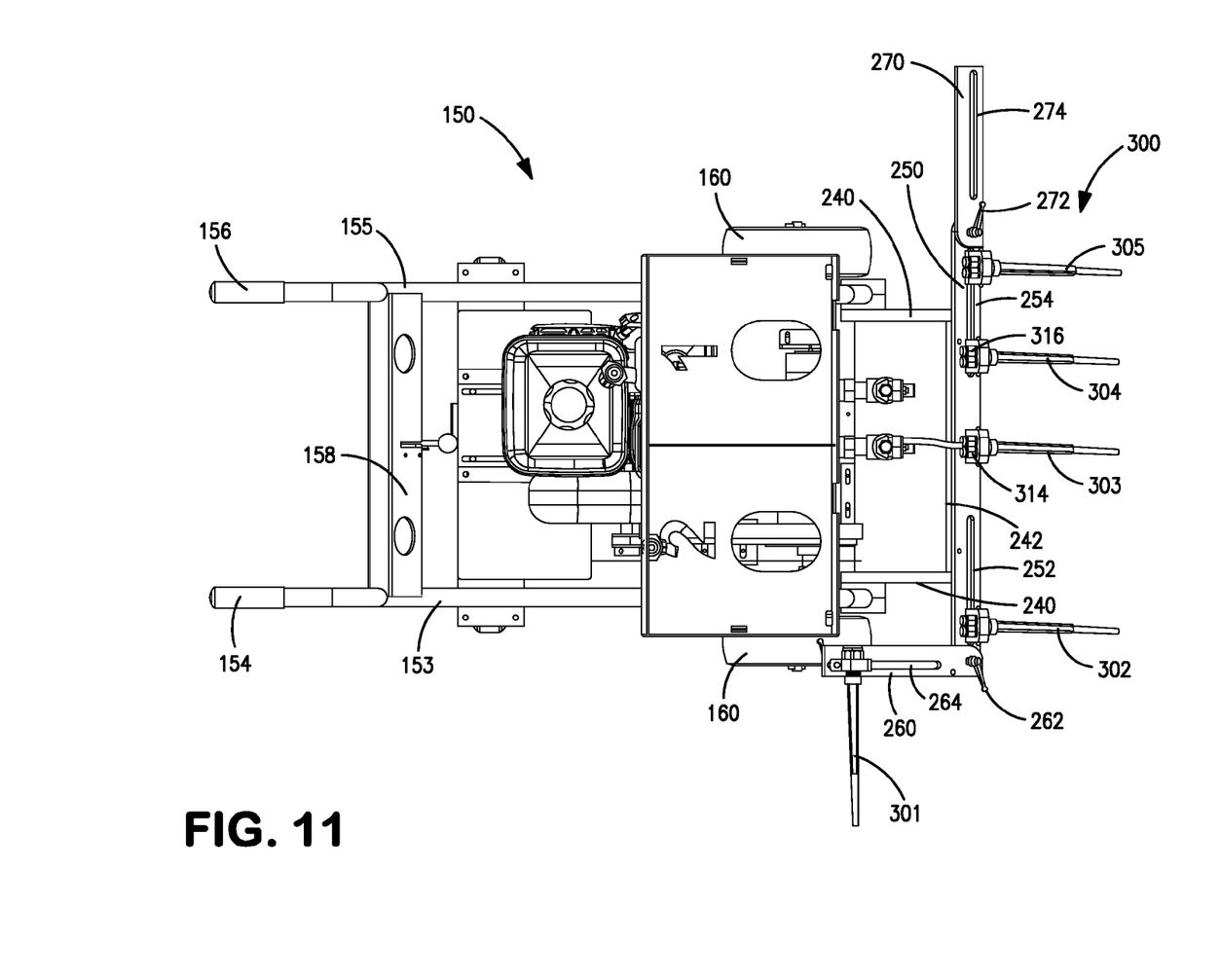
FIG. 11 is a top plan view of the dispensing cart of FIG. 9.

The cart 150 includes a tubular mainframe 152 which mounts the various dispenser components and component materials, and provides a high degree of mobility and efficient organization for the dispenser system. The frame 152 includes a pair of laterally spaced angular tubular supports 153 and 155 which upwardly terminate in handlebars with grips 154 and 156. An upper cross-support panel assembly 158 extends between the frontal portion of the handlebars. A pair of wheels 160 is mounted at the lower frontal location. A pair of laterally spaced, angled tubular supports 166 and 168 extends forwardly from a medial location of the handlebars and terminates at the forward end of the supports 153 and 155. A raised rear platform 162 is mounted to a tubular brace 157 at an underside of the supports 153 and 155. The platform mounts a pivotal rear wheel assembly 164. The mainframe and wheel assembly thus provides a cart which may be easily rolled across a surface and turned and guided as required.

A lateral, slightly forwardly inclined, horizontal tray 170 is mounted to the support arms. The tray has a circumferential upstanding flange 172. The tray also includes openings 174 as well as a generally upright position guide 176. A pair of forwardly spaced slots 178 is also formed in the retention tray 170 which functions to receive cartons of part 1 and part 2 adhesive, as previously described for tray 70.

A shelf 180 extends between the tubular supports 153 and 155 and a lower forward portion adjacent the joining of the supports 166 and 168 to form a generally horizontally disposed support platform. A dual inline geroter pump assembly 190 comprises a pair of pump units 192 and 194 mounted to the support platform. A shaft extends from the pump assembly and connects via a centrifugal clutch 188 with a belt driven pulley 189. A gasoline powered engine 200 is mounted to the rear platform 162. The drive shaft of the motor connects with a pulley 202 and turns the belt 204 for driving the dual pump assembly 190 via the clutch 188. A belt guard 210 covers the belt. It should be appreciated that the pump units are driven by a gasoline powered engine 200 which is controlled by a throttle lever 206 attached to the cross-panel 158 proximate the handlebars. At low idle engine speeds, the clutch 188 functions to disengage the pump drive shaft from rotating and the pump assembly from operating.

Pump unit 192 has an inlet 191. Pump unit 194 (which is preferably mounted in reverse relationship to pump unit 192) has a similarly configured inlet 193. Inlets 191 and 193 communicate and connect via connectors with respective transparent hoses 195 and 197. The hoses may be secured to the inlets by hose clamps 199. One of the hoses preferably includes a striped marking and/or the hoses are color coded so that the part 1 and part 2 component paths may be readily identified. The hoses 195 and 197 have fittings which connect and communicate with the packaging units 11 received on the trays. The fittings connect as previously described so that each part of the adhesive is supplied under gravity to the respective pump units. The tilt of the tray 170 aids in ensuring most, if not all, of the component materials are used.

A nozzle assembly 300 disposed at the lower front end of the cart employs nozzles 301-305 which are variable in terms of numbers of active operating nozzles and in terms of positions and spacing. The nozzles 301-305 function to mix the adhesive components and expel adhesive in the form of transversely spaced beads.

An arm 240 extends forwardly from each of the tubular supports 166, 168. The arms 240 each pivotally mount via a bracket 242 a transverse bar 250. The bar is pivotal about a transverse axis. The pivot position is fixed by a releasable clamp (not illustrated) at one side of the bar. The bar has a pair of elongated slots 252, 254 and a central slot for mounting nozzles. A wing extension 260, 270 connects at each end of the bar. Each wing extension is secured by a clamp connector 262, 272 which allows the wing extension to be positioned at various angular positions and tightened in position by a clamp lock. In FIGS. 9-11, a generally upright, non-usage or transport position for extension 260 is illustrated. The other wing extension 270 is positioned essentially for usage co-linearly with the bar and clamped in place. If required for a given application, both wing extensions 260, 270 are positioned co-linearly to the bar at opposed ends. Each of the wing extensions also includes an elongated slot 264, 274 for mounting a nozzle.

The nozzles 301-305 in addition to being variably positionable are preferably disposable. The nozzles are also effectively mixing nozzles in which the adhesive components are effectively only combined and mixed at the nozzles. With additional reference to FIG. 14, a retaining collar 306 extends around a neck portion 308 of each nozzle body 310 and snaps into a slot. Each nozzle body includes a ball detent and locks the nozzle in position by a friction fit. Each nozzle tip 312 includes a square mix tip and at the opposite end, threads onto the nozzle body 310. Each nozzle body has a pair of barbed inlet fittings 314 and 316. One or more nozzles may also be mounted to each of the wing extensions 260, 270. It should be appreciated that the nozzles may be selectively transversely positioned along the bar 250 at the slots. Typically, the central nozzle 303 position is fixed at the center of the anchoring bar. In addition, the transverse pivot angle of the bar 250, and hence the nozzles, may be adjusted and fixed. The nozzles are preferably oriented forwardly and downwardly at the lower front of the cart.

Figure 12:
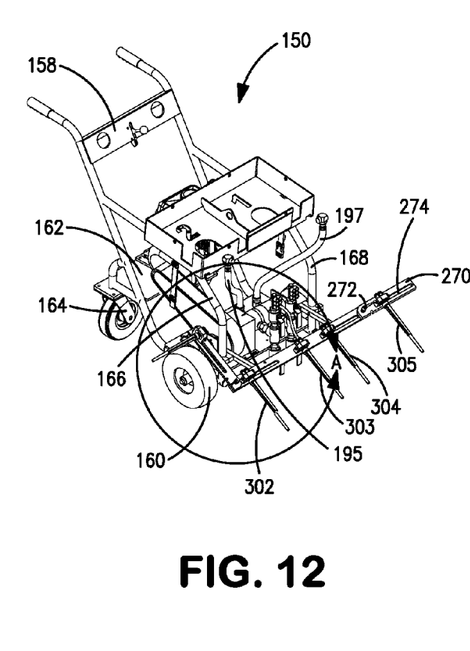
FIG. 12 is a perspective view of the dispensing cart of FIG. 9 with certain portions being configured in an alternative functional mode, and portions being removed.
Figure 13:
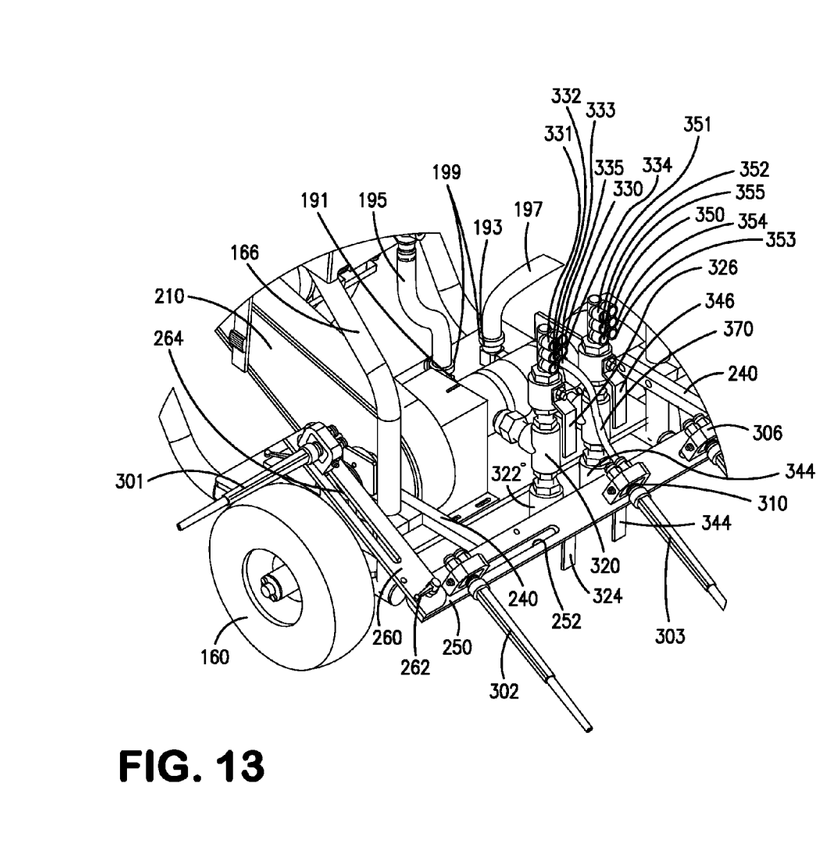
FIG. 13 is an enlarged perspective view of the circled portion designated A in FIG. 12.

The outlets of each of the pump units 192 and 194, respectively, each connect with a T-fitting 320 and 340. Each T-fitting 320 and 340 has a lower outlet opening 322, 342 which is controlled by a lever operated valve 324, 344. The upper portion of the T-fitting passes through a second lever valve 326, 346 to connect with a six bank manifold 330, 350, each having connectors 331-336 and 351-356. A transparent tube 360 connects each of connectors 331-336 and connects with a nozzle body fitting 314 for a nozzle 301-305, as will be described below. Similarly, a second transparent tube 370 connects each of connectors 351-356 and connects with a nozzle body fitting 316 for each nozzle 301-305 as also described below. When not in use, the connectors are plugged. An additional connector is provided in case one becomes inoperative.

Each nozzle body thus effectively has a dual inlet push connector in the form of fittings 314, 316. Transparent tubes 360, 370 respectively connect between each push connector fitting 314, 316 and a connector of a respective manifold 330, 350. One of the tubes has a striped marking and/or the tubes 360, 370 are color coded. One tube 360 connects to a connector of one manifold 330 and the other tube 370 connects with the connector of another manifold 350, i.e., one tube connects with the part 1 communication path and the other tube connects with the part 2 communication path. It should be appreciated that the striped marking and/or color coding facilitates connecting to the proper communication path from the respective pump so that there is no cross contamination and mixing until the materials reach the dispensing nozzles. After a job has been completed, the tubes 314, 316 and the dispensing nozzles 301-305 can be removed and discarded.

The bar 250 is also angularly positionable so that the nozzles 301-305 may be positioned in a selected angular orientation to the surface to which the membrane is to be applied.

The dispensing cart 150 provides a structure whereby the dispensing nozzles can be selectively positioned to provide the desired bead spacings for a given project. The pump units are then activated and the part 1 and part 2 adhesive components are pumped for mixing and dispensing at the nozzles. For some applications, the extensions and the associated nozzles can be positioned to add additional nozzles.

Figure 14:
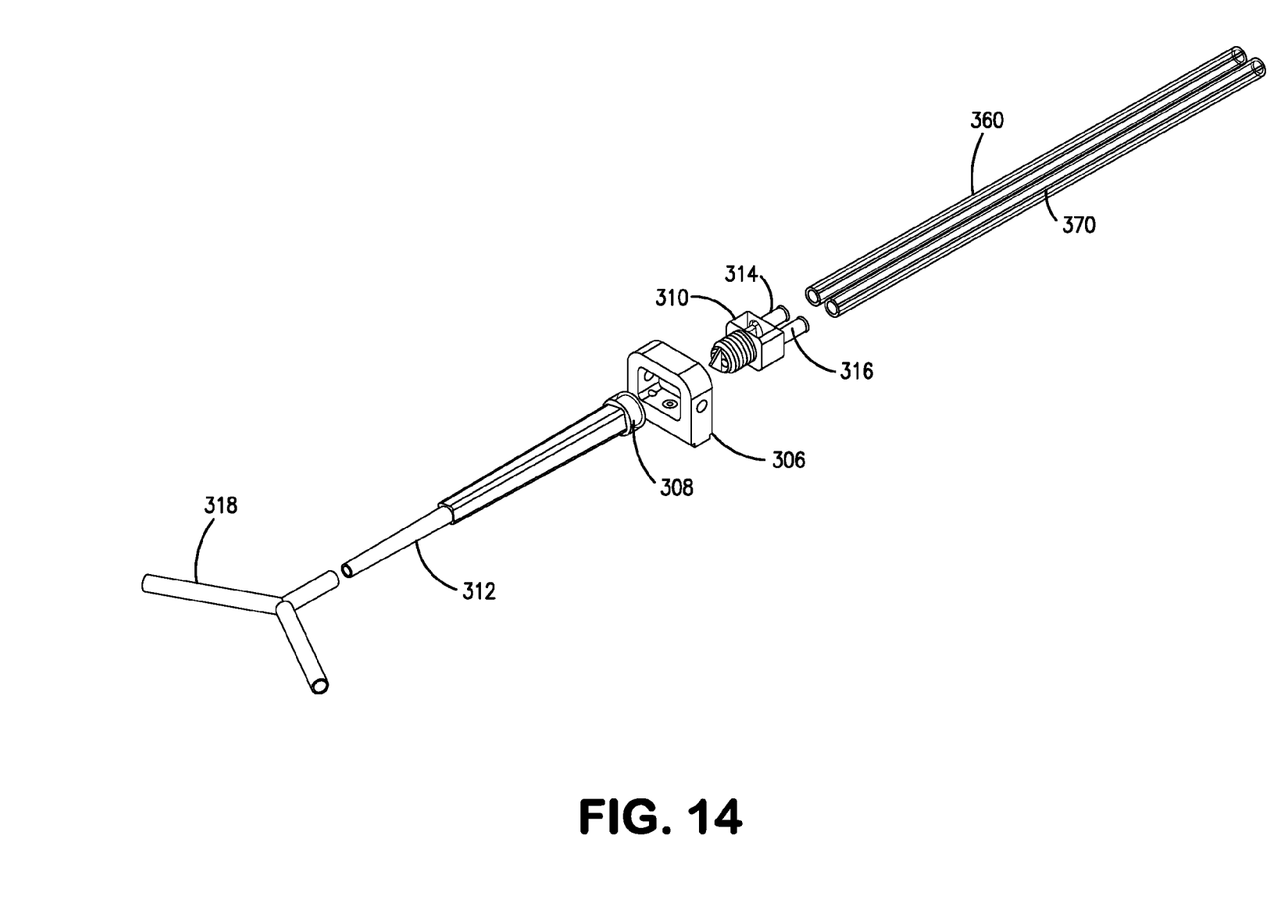
FIG. 14 is an exploded perspective view of a nozzle subassembly for the cart of FIG. 9 and further illustrating an alternative nozzle configuration.

The foregoing dispensing cart, for example, could provide from two to five beads according to the various applications. For adhering roofing membrane, typically five 12" on center beads are employed. In addition, each of the nozzles may be affixed with a dual tip or Y-nozzle tip 318, such as illustrated in FIG. 14. This would allow for essentially doubling of the numbers of beads.

Another feature of the dispensing cart 150 is the provision of the clutch 188. If the pump units were to become clogged, then the clutch would disengage the shaft from the pumps so that the pumps could be cleaned and the pump drive shaft would not be damaged. In addition, the throttle provides for an idling speed of the pump assembly 140 so that when the speed is below a certain value, there is no pumping action.

What is claimed:

1. A cart for dispensing a two-part adhesive comprising:
a frame assembly mounting at a lower frontal portion a pair of wheels and a wheel at a lower rear portion with a pair of upper transversely spaced handlebars;
a tray mounted to said frame assembly and having a pair of openings for receiving a carton containing one adhesive part and a carton containing a second adhesive part;
a dual pump assembly mounted to said frame assembly and having two independent inlets and two independent outlets;
first and second conduits respectively connecting said pump assembly at said inlets;
first and second outlet manifolds respectively communicating with said outlets and each manifold having a plurality of connectors;
a mounting bar mounted at a lower frontal portion of said frame assembly and mounting a plurality of transversely spaced nozzles; and
a plurality of conduit pairs each connecting a connector of each manifold and a said nozzle;
wherein when a part 1 component and a part 2 component carton are received on said tray and are connected to a respective first and second conduits and said pump assembly is activated, part 1 component and part 2 component are pumped to said nozzles, mixed and dispensed as adhesive through said nozzles.

2. The cart of claim 1 wherein said mounting bar is pivotally adjustable about a transverse axis.

3. The cart of claim 1 wherein said mounting bar comprises a pair of transversely extending slots and nozzles are secured to said bar along said slots.

4. The cart of claim 3 wherein nozzles are selectively positionable along said mounting bar.

5. The cart of claim 1 further comprising a pair of wing extensions mounted at opposing ends of said mounting bar and adapted for selective pivotal positioning relative to said mounting bar.

6. The cart of claim 5 wherein each said extension includes a slot and a nozzle is mounted along said slot.

7. The cart of claim 6 wherein said extensions are positionable in generally co-linear relationship to said mounting bar, and nozzles mounted to said wing extensions align with nozzles mounted to said mounting bar in generally parallel spaced relationship.

8. The cart of claim 1 wherein one conduit of said conduit pairs includes a distinctive marking.

9. The cart of claim 1 wherein said conduit pairs and said nozzles are removably dismountable for discarding.

10. The cart of claim 1 wherein said tray is disposed at a slight forwardly downward orientation.

11. The cart of claim 1 wherein said dual pump unit is powered by a gasoline engine.

12. The cart of claim 11 wherein said engine is controlled by a throttle lever.

13. A cart for dispensing a two-part adhesive comprising:
a frame assembly having wheels and capable of being rolled across a surface;
a tray mounted to said frame assembly configured to receive a carton containing one adhesive part and a carton containing a second adhesive part;
a pump assembly mounted to said frame assembly and having two independent inlets and two independent outlets;
first and second conduits respectively connecting said pump assembly at said inlets;
first and second outlet manifolds respectively communicating with said outlets and each manifold having a plurality of connectors;
a plurality of transversely spaced nozzles mounted at a lower frontal portion of said frame assembly; and
a plurality of conduit pairs each communicating with an outlet manifold and a said nozzle;
wherein when a part 1 and a part 2 adhesive carton are received on said tray and are respectively connected to said first and second conduits and said pump assembly is activated, one adhesive part and a second adhesive part are pumped separately to said nozzles, mixed and expelled through said nozzles to form transversely spaced beads of adhesive.

14. The cart of claim 13 wherein a mounting bar is pivotally adjustable about a transverse axis and a plurality of said nozzles are mounted to said bar.

15. The cart of claim 13 wherein said mounting bar comprises a pair of transversely extending slots and nozzles are secured to said bar along said slots.

16. The cart of claim 13 wherein each nozzle has a dual outlet tip.

* * * * *